US009087001B1

(12) United States Patent
Christensen et al.

(10) Patent No.: US 9,087,001 B1
(45) Date of Patent: Jul. 21, 2015

(54) VIRTUALIZING MULTIPLE NETWORKED MACHINES USING A PREDETERMINED NETWORK RECOVERY POLICY

(71) Applicant: STORAGECRAFT TECHNOLOGY CORPORATION, Draper, UT (US)

(72) Inventors: Thomas Frank Christensen, Salt Lake City, UT (US); Christopher Glade Derrick, West Jordan, UT (US); David Merrill McConkie, Jr., Salt Lake City, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 0 days.

(21) Appl. No.: 14/599,273

(22) Filed: Jan. 16, 2015

(51) Int. Cl.
*G06F 11/00* (2006.01)
*G06F 11/14* (2006.01)
*G06F 9/455* (2006.01)

(52) U.S. Cl.
CPC ........ *G06F 11/1415* (2013.01); *G06F 9/45558* (2013.01); *G06F 2009/45595* (2013.01); *G06F 2201/815* (2013.01)

(58) Field of Classification Search
CPC .................................................. G06F 11/0712
See application file for complete search history.

(56) References Cited

U.S. PATENT DOCUMENTS

| 7,761,540 | B2* | 7/2010 | Marks et al. ................... 709/222 |
| 8,019,837 | B2* | 9/2011 | Kannan et al. ................ 709/220 |
| 2003/0126242 | A1* | 7/2003 | Chang ........................... 709/222 |
| 2005/0278583 | A1* | 12/2005 | Lennert et al. ................... 714/43 |
| 2007/0136447 | A1* | 6/2007 | Nakajima et al. ............. 709/220 |
| 2007/0268917 | A1* | 11/2007 | Wong et al. ................... 370/401 |
| 2008/0183812 | A1* | 7/2008 | Paul et al. ...................... 709/203 |
| 2012/0204173 | A1* | 8/2012 | Liu ..................................... 718/1 |
| 2013/0212437 | A1* | 8/2013 | Timashev et al. .............. 714/37 |
| 2013/0326260 | A1* | 12/2013 | Wei et al. .......................... 714/3 |
| 2014/0195848 | A1* | 7/2014 | Teli et al. ......................... 714/15 |
| 2014/0331309 | A1* | 11/2014 | Spiers et al. .................... 726/12 |
| 2014/0337493 | A1* | 11/2014 | Tung .............................. 709/222 |

* cited by examiner

*Primary Examiner* — Christopher McCarthy

(74) *Attorney, Agent, or Firm* — Maschoff Brennan

(57) ABSTRACT

Virtualizing multiple networked machines using a predetermined network recovery policy. In one example embodiment, a method for virtualizing multiple networked machines using a predetermined network recovery policy may include identifying multiple image backups of the multiple networked machines, determining an order for booting the multiple networked machines as multiple networked virtual machines, determining network settings for the multiple networked machines when booted as the multiple networked virtual machines, storing the order and the network settings in the predetermined network recovery policy prior to booting the multiple networked machines as the multiple networked virtual machines, booting the multiple networked machines as the multiple networked virtual machines from the multiple image backups in the order stored in the predetermined network recovery policy and with the network settings stored in the predetermined network recovery policy subsequent to the storing and in response to receiving a command to implement the predetermined network recovery policy.

27 Claims, 4 Drawing Sheets

| Physical Machine | Network Recovery Policy 300 ||||||||
| | Boot Order || Boot Timing || Network Settings |||
| | Designated Order | Dependencies - Depends On | Wait Time Before Next Machine Boot | Real-Time Based On Ready State | Network Role Assignment | Static IP Address | Port Blocking Rules | Port Forwarding Rules |
| 102a | 1 | N/A | 300 Seconds | Yes | Domain Controller | 192.168.20.5 | Deny All | N/A |
| 102b | 2 | 102a | 300 Seconds | Yes | Exchange Server | 192.168.20.10 | Deny All | Allow TCP ports 25, 80, and 443 |
| 102c | 3 | 102b | 100 Seconds | Yes | Web Server | 192.168.20.11 | Deny All | Allow TCP ports 80, and 443 |

*FIG. 3*

VIRTUALIZING MULTIPLE NETWORKED MACHINES USING A PREDETERMINED NETWORK RECOVERY POLICY

FIELD

The embodiments disclosed herein relate to virtualizing multiple networked machines using a predetermined network recovery policy.

BACKGROUND

Individual physical computers, also known as physical machines, are often configured to exchange data with one another over a computer network, also known as being networked together. In order for networked physical machines to communicate over the network, various network settings may need to be configured. These network settings may designate various roles performed by the physical machines, addresses of the physical machines, and port rules for the physical machines, among other things.

Physical machines face a myriad of threats to their smooth and continuous operation, including threats to the data stored in storages of the physical machines. A storage is computer-readable media capable of storing data. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

When a user desires to restore the storages of multiple networked physical machines from backups, the restoration to storages on new physical machines can involve a number of challenges, including taking an unacceptable amount of time. In order to shorten the amount of time it takes to restore the storages of multiple networked physical machines from backups, a user may restore the backups to virtual storages on virtual machines.

A virtual machine is a software-based emulation of a physical machine in a process generally known as virtualization. A virtual machine generally operates based on the computer architecture and functions of a physical machine. A hypervisor is computer software, computer firmware, or computer hardware that creates and runs virtual machines. A computer on which a hypervisor is running one or more virtual machines is generally referred to as a host machine, while each virtual machine running on the hypervisor is generally referred to as a guest virtual machine. A hypervisor generally creates a guest virtual machine by accessing a virtual machine file, which may be a backup of a storage of a physical machine, that contains or references data that is used to create the guest virtual machine. The hypervisor also generally presents the guest virtual machines with a virtual operating platform and manages the execution of operating systems and network settings of the guest virtual machines.

One common problem encountered by a user when utilizing a hypervisor to restore storages of multiple networked physical machines from backups to virtual storages on virtual machines is the time and effort involved for the user to manually boot the virtual machines and manually configure the network settings during the virtualization. For example, in a disaster scenario where multiple networked physical machines have become unavailable due to an earthquake, fire, or other disaster, the user may be stressed and consequently find it very difficult to clearly think through the manual booting of the virtual machines and the manual configuring of network settings during the virtualization. As a result, slow user performance and user errors during a restoration in a disaster scenario are commonplace. Slow user performance and user errors during the manual booting of virtual machines and manual configuring of network settings during virtualization can increase downtime, thereby further exacerbating the detrimental effects of the disaster.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to virtualizing multiple networked machines using a predetermined network recovery policy. The example methods disclosed herein may be employed to allow a hypervisor to restore storages of multiple networked physical machines from backups to virtual storages on networked virtual machines using a predetermined network recovery policy. The use of the predetermined network recovery policy may allow advance testing of the virtualization and may avoid a user needing to manually boot the virtual machines and manually configure network settings during the virtualization, thus avoiding slow user performance and user errors and decreasing downtime during the virtualization.

In one example embodiment, a method for virtualizing multiple networked machines using a predetermined network recovery policy may include identifying multiple image backups of the multiple networked machines, determining an order for booting the multiple networked machines as multiple networked virtual machines, determining network settings for the multiple networked machines when booted as the multiple networked virtual machines, storing the order and the network settings in the predetermined network recovery policy prior to booting the multiple networked machines as the multiple networked virtual machines, booting the multiple networked machines as the multiple networked virtual machines from the multiple image backups in the order stored in the predetermined network recovery policy and with the network settings stored in the predetermined network recovery policy subsequent to the storing and in response to receiving a command to implement the predetermined network recovery policy.

In another example embodiment, a method for virtualizing multiple networked machines using a predetermined network recovery policy may include identifying multiple image backups of the multiple networked machines, determining an order, and a timing, for booting the multiple networked machines as multiple networked virtual machines, determining network settings for the multiple networked machines when booted as the multiple networked virtual machines, storing the order, the timing, and the network settings in the predetermined network recovery policy prior to booting the multiple networked machines as the multiple networked virtual machines, and automatically booting the multiple networked machines as the multiple networked virtual machines from the multiple image backups in the order and with the timing stored in the predetermined network recovery policy and with the network settings stored in the predetermined network recovery policy subsequent to the storing and in response to receiving a command to implement the predetermined network recovery policy. In this example embodiment, the network settings may include static Internet Protocol (IP)

addresses, port blocking rules, port forwarding rules, network role assignments, Virtual Private Network (VPN) configuration, firewall rules, or some combination thereof, for the multiple networked virtual machines.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3 is a schematic block diagram illustrating an example network recovery policy.

DESCRIPTION OF EMBODIMENTS

Figure 1:
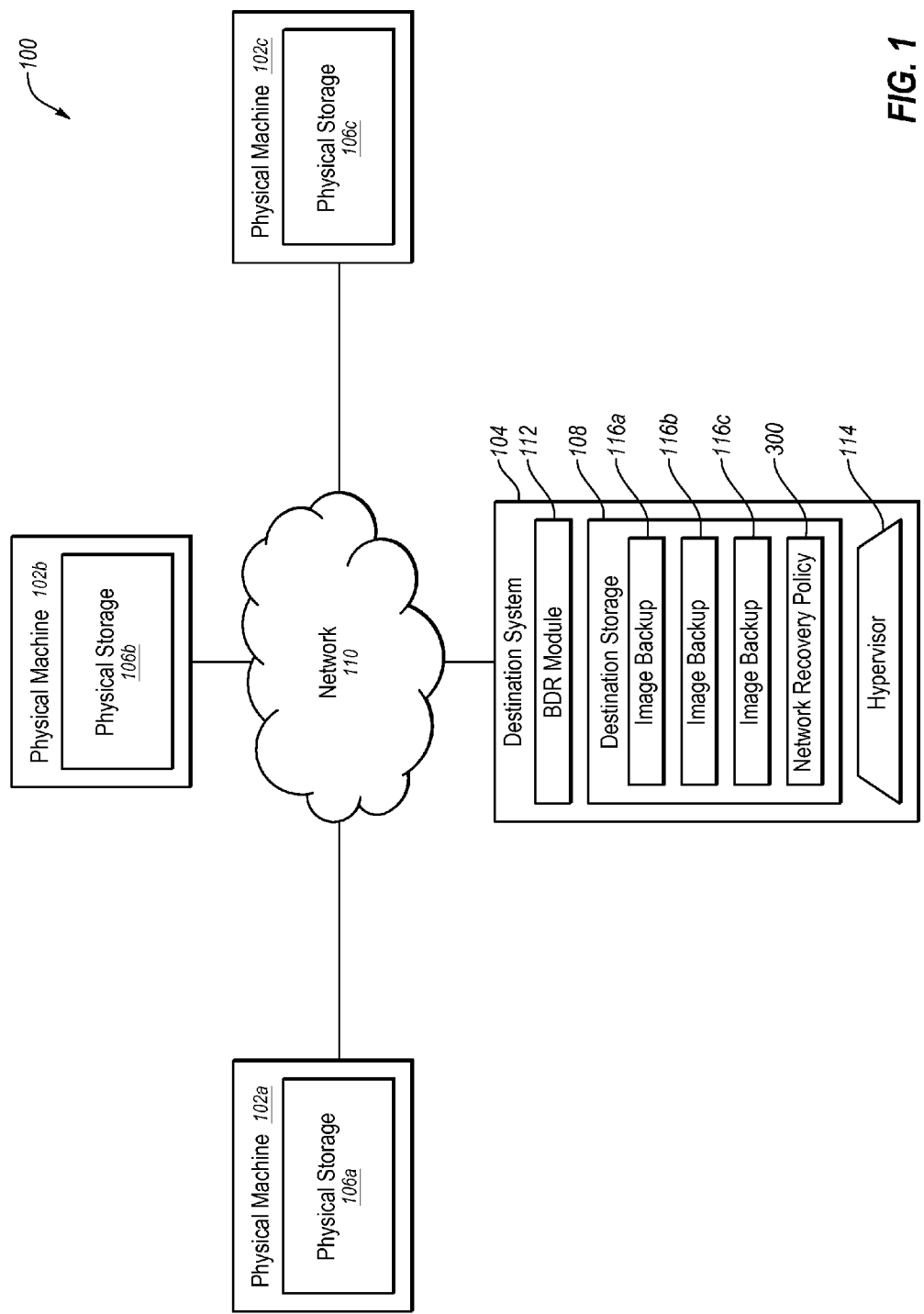
FIG. 1 is a schematic block diagram illustrating an example physical networked backup system.

FIG. 1 is a schematic block diagram illustrating an example physical networked backup system 100. As disclosed in FIG. 1, the example system 100 may include physical machines 102a-102c and a destination system 104. The physical machines 102a-102c may include physical storages 106a-106c, respectively, and the destination system 104 may include a destination storage 108. The physical machines 102a-102c and the destination system 104 may be networked together over network 110. The destination storage 108 may store image backups 116a-116c of the physical storages 106a-106c, respectively. The destination storage 108 may further store a network recovery policy 300. As discussed in greater detail below, the network recovery policy 300 may include boot settings and network settings for restoring the physical machines 102a-102c as virtual machines. The destination system 104 may further include a backup disaster recovery (BDR) module 112 and a hypervisor 114.

Each of the machines 102a-102c and the system 104 may be any computing device capable of supporting a storage and communicating with other systems including, for example, file servers, web servers, other servers, personal computers, desktop computers, laptop computers, handheld devices, multiprocessor systems, microprocessor-based or programmable consumer electronics, smartphones, digital cameras, hard disk drives, and flash memory drives. The network 110 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

The image backups 116a-116c stored in the destination storage 108 may be created by the BDR module 112. For example, the BDR module 112 may be configured to execute computer instructions to perform image backup operations of creating full and/or incremental or decremental image backups of the physical storages 106a-106c. Each of the image backups 116a-116c may actually be a chain of full/incremental image backups, full/decremental image backups, or full/incremental/decremental image backups. It is noted that the image backups 116a-116c may initially be created on the physical machines 102a-102c and then copied to the destination system 104. The image backups 116a-116c may be stored on the destination system 104, which may be in a different physical location (such as a different city) from the physical machines 102a-102c, to enable a restoration of the networked physical machines 102a-102c in the event that the networked physical machines 102a-102c become unavailable due to, for example, a disaster such as a fire or an earthquake. This restoration may be accomplished virtually using the hypervisor 114.

Figure 2:
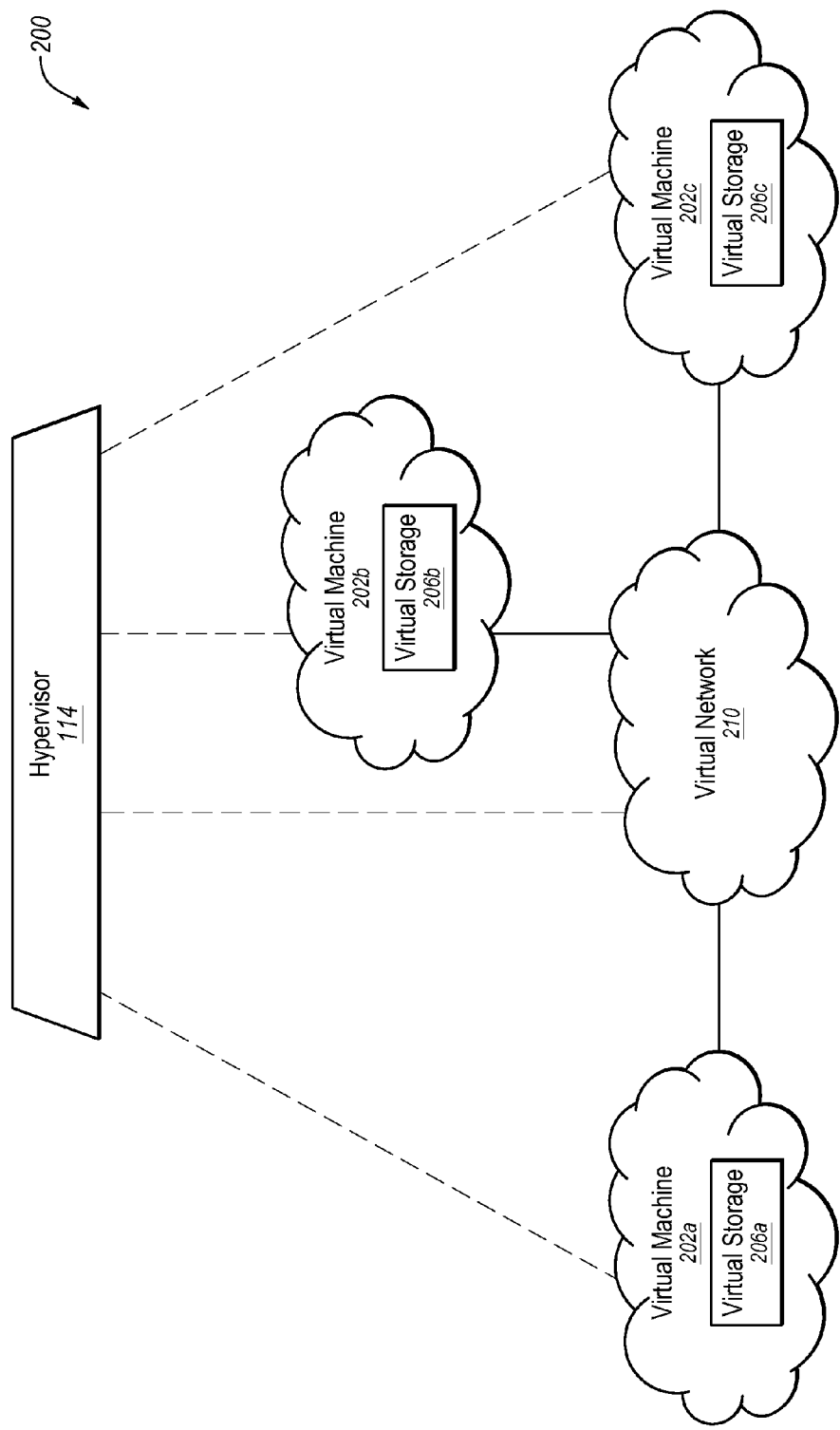
FIG. 2 is a schematic block diagram illustrating an example virtual networked restoration system.

FIG. 2 is a schematic block diagram illustrating an example virtual networked restoration system 200. As disclosed in FIG. 2, the example system 200 may include virtual machines 202a-202c that are created and run by the hypervisor 114 of the system 100 of FIG. 1. The hypervisor 114 may create the virtual machines 202a-202c from the image backups 116a-116c, respectively, by restoring the image backups 116a-116c to the virtual storages 206a-206c, respectively, and then booting each of the virtual storages 206a-206c. Further, the hypervisor 114 may create the virtual network 210 by configuring the network settings of the virtual machines 202a-202c and the virtual network 210 according to the network settings in the network recovery policy 300 of FIG. 1.

The hypervisor 114 may be computer software, computer firmware, computer hardware, or some combination thereof, of the destination system 104 of FIG. 1, which acts as a host machine. The hypervisor 114 is configured to create, run, and manage one or more of the virtual machines 202a-202c, which each acts as a guest virtual machine. The virtual machines 202a-202c are software-based emulations of the physical machines 102a-102c of FIG. 1 that are configured to execute programs in a manner similar to the physical machines 102a-102c.

In one example embodiment, the hypervisor 114 may be a VMware® vSphere® hypervisor, and the image backups 116a-116c of FIG. 1 may be StorageCraft® ShadowProtect® Full (SPF) backup image files. Using the example methods disclosed herein, the VMware® vSphere® hypervisor may create the virtual machines 202a-202c using the SPF backup image files.

Although only a single storage is disclosed in each of the physical machines 102a-102c of FIG. 1, the virtual machines 202a-202c of FIG. 2, and the destination system 104 of FIG. 1, it is understood that each of these machines or system may instead include two or more storages. Further, although the destination storage 108 is disclosed in FIG. 1 as being local to the hypervisor 114, it is understood that the destination storage 108 may be remote from the hypervisor 114. Further, one or more of the image backups 116a-116c may be stored remotely from the hypervisor 114. Further, although the BDR module 112 is the only module and the hypervisor 114 is the only hypervisor disclosed in the example system 100 of FIG. 1, it is understood that the functionality of the BDR module 112 and/or of the hypervisor 114 may be replaced or augmented by one or more similar modules and/or hypervisors on the destination system 104 or on another machine or system that is local to or remote from the destination system 104.

Having described one specific environment with respect to FIGS. 1 and 2, it is understood that the specific environment of FIGS. 1 and 2 is only one of countless environments in which the example methods disclosed herein may be employed. The scope of the example embodiments is not intended to be limited to any particular environment.

FIG. 3 is a schematic block diagram illustrating the example network recovery policy 300 of FIG. 1. As disclosed in FIG. 3, the network recovery policy 300 may be determined prior to a catastrophic event such as an earthquake, fire, or other disaster, in order to allow the network physical machines 102a-102c of FIG. 1 to be restored as networked virtual machines 202a-202c of FIG. 2 using the hypervisor 114 of FIGS. 1 and 2. The use of the predetermined network recovery policy 300 may allow advance testing of the virtualization and may avoid a user needing to manually boot the virtual machines 202a-202c of FIG. 2 and manually configure the network settings of the virtual network 210 of FIG. 2 during the virtualization, thus avoiding slow user performance and user errors and decreasing downtime during the virtualization.

As disclosed in FIG. 3, the network recovery policy 300 may include a boot order for the physical machines 102a-102c. This boot order may be designated by the user in terms of a set numerical order (e.g., 1, 2, and 3) or in terms of dependencies (e.g., the physical machine 102b depends on physical machines 102), or both.

As disclosed in FIG. 3, the network recovery policy 300 may also include a boot timing for the physical machines 102a-102c. This boot timing may be designated by the user in terms of a specific amount of time to wait before booting the next machine (e.g. waiting 300 seconds after beginning the boot of the physical machine 102a to begin booting the next machine) or in terms of a yes/no flag that specifies that the boot timing should be determined in real-time based on the ready state of the machine being booted (e.g. waiting to boot the physical machine 102b until it is determined that the physical machine 102a has finished booting and is in a ready state), or both.

As disclosed in FIG. 3, the network recovery policy 300 may also include network settings such as network role assignments, static Internet Protocol (IP) addresses, port blocking rules, and port forwarding rules for the networked physical machines 102a-102c. The network role assignments may include assigned roles of domain controller, Dynamic Host Configuration Protocol (DHCP) Server, exchange server, another network role assignment, or some combination thereof. Other network settings that may be included in the network recovery policy 300 are Virtual Private Network (VPN) configuration, firewall rules, or some combination thereof for the networked physical machines 102a-102c It is understood that the information stored in the network recovery policy 300 may apply equally to the virtual machines 202a-202c of FIG. 2 that correspond to the physical machines 102a-102c of FIG. 1, respectively. Therefore, when the physical machines 102a-102c of FIG. 1 are virtualized by the hypervisor 114 as the virtual machines 202a-202c of FIG. 2, the information stored in the network recovery policy 300 can be employed by the hypervisor 114 to create the example virtual networked restoration system 200 of FIG. 2.

Figure 4:
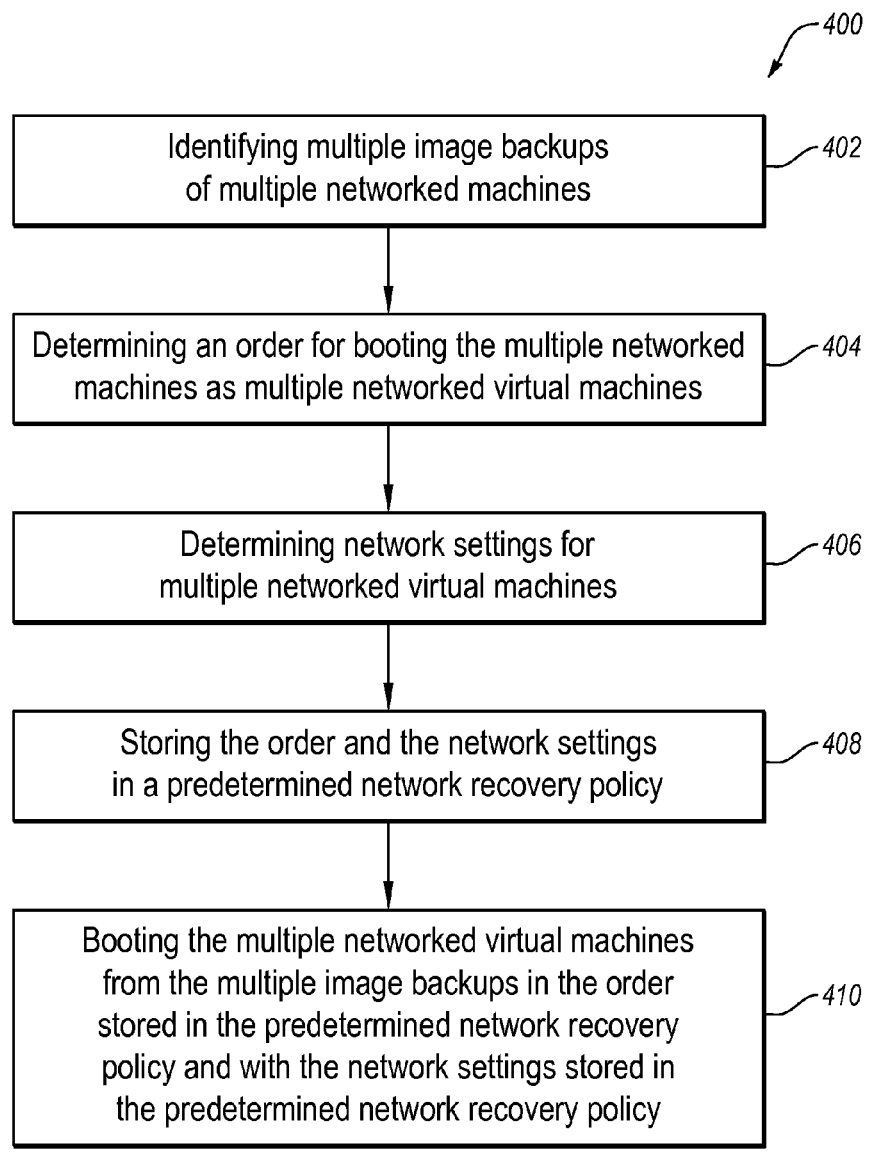
FIG. 4 is a schematic flowchart diagram of an example method for virtualizing multiple networked machines using a predetermined network recovery policy.

FIG. 4 is a schematic flowchart diagram of an example method 400 for virtualizing multiple networked machines using a predetermined network recovery policy. The method 400 may be implemented, in at least some embodiments, by the BDR module 112 of FIG. 1 and the hypervisor 114 of FIGS. 1 and 2. For example, the BDR module 112 and the hypervisor 114 may be configured as one or more programs stored on one or more non-transitory computer-readable media that are configured, when executed, to cause one or more processors to perform operations of virtualizing the multiple networked physical machines 102a-102c of FIG. 1 using the predetermined network recovery policy 300 of FIGS. 1 and 3, as represented by one or more of steps 402-410 of the method 400. Although illustrated as discrete steps, various steps may be divided into additional steps, combined into fewer steps, or eliminated, depending on the desired implementation. The method 400 will now be discussed with reference to FIGS. 1-4.

The method 400 may include a step 402 of identifying multiple image backups of multiple networked machines. For example, the BDR module 112 may, at step 402, identify the image backups 116a-116c of the networked physical machines 102a-102c, which are stored in the destination storage 108 of the destination system 104 of FIG. 1. Additionally or alternatively, step 402 may be performed based on a designation of the multiple image backups of the multiple networked machines received from a user. For example, the BDR module 112 may, at step 402, identify the image backups 116a-116c based on a designation of the image backups 116a-116c received from a user. This designation may be received from the user, for example, via a graphical user interface (GUI) associated with the BDR module 112 that is configured to allow the user to visually select the image backups 116a-116c. Additionally or alternatively, step 402 may be performed based on the multiple image backups of the multiple networked machines belonging to a single backup job. For example, the BDR module 112 may, at step 402, identify the image backups 116a-116c based on the image backups 116a-116c belonging to a single backup job. Belonging to a single backup job may entail the image backups 116a-116c representing the states of the physical machines 102a-102c at a single point in time.

The method 400 may include a step 404 of determining an order for booting the multiple networked machines as multiple networked virtual machines. For example, the BDR module 112 may, at step 404, determine an order for booting the networked machines 102a-102c of FIG. 1 as the networked virtual machines 202a-202c of FIG. 2. Additionally or alternatively, step 404 may be based on a designation of the order received from a user. For example, the BDR module 112 may, at step 404, determine an order for booting the networked virtual machines 202a-202c of FIG. 2 based on a designation of the boot order received from a user. This designation may be received from the user, for example, via a GUI associated with the BDR module 112 that is configured to allow the user to visually specify a numerical boot order for the networked virtual machines 202a-202c, as disclosed in FIG. 3. Additionally or alternatively, step 404 may be performed based on a designation of dependencies between the multiple networked machines received from a user. For example, the BDR module 112 may, at step 404, determine an order for booting the networked virtual machines 202a-202c of FIG. 2 based on a designation of dependencies between the networked machines 102a-102c of FIG. 1 received from a user, as disclosed in FIG. 3. This designation may be received from the user, for example, via a GUI associated with the BDR module 112 that is configured to allow the user to visually input dependencies using graphical elements beyond text including, but not limited to, lines in a hierarchical graph, rows in a chart, and arrows.

Additionally or alternatively, step 404 may include determining a timing for booting the multiple networked machines as the multiple networked virtual machines. For example, the BDR module 112 may, at step 404, determine a timing for booting the networked machines 102a-102c of FIG. 1 as the networked virtual machines 202a-202c of FIG. 2. Additionally or alternatively, the timing may be a specific wait time between the booting of each of the multiple networked machines as multiple networked virtual machines. For example, the timing for the virtual machine 202a corresponding to the physical machine 102a may be a wait time of 300 seconds before booting the virtual machine 202b corresponding to the physical machine 102b, as disclosed in FIG. 3. Additionally or alternatively, the timing may be determined in real-time during the booting of the multiple networked machines as the multiple networked virtual machines based on the timing of each of the multiple networked virtual machines achieving a ready state. For example, the timing for booting the virtual machine 202b may be determined in real-time during the booting of the virtual machine 202a based on the virtual machine 202b being dependent on the virtual machine 202a, as designated in the network recovery policy of FIG. 3, and based on a real-time determination that the virtual machine 202a has achieved a ready state.

The method 400 may include a step 406 of determining network settings for the multiple networked virtual machines. For example, the BDR module 112 may, at step 406, determine network settings for the networked machines 102a-102c of FIG. 1 when booted as the networked virtual machines 202a-202c of FIG. 2. The network settings determined at step 406 may include network role assignments, static Internet Protocol (IP) addresses, port blocking rules, port forwarding rules, or some combination thereof, for the networked virtual machines 202a-202c of FIG. 2, as disclosed in FIG. 3. Additionally or alternatively, the network settings determined at step 406 may include Virtual Private Network (VPN) configuration, firewall rules, or some combination thereof, for the networked virtual machines 202a-202c of FIG. 2. The network role assignments for the networked virtual machines 202a-202c of FIG. 2 may include assigned roles of domain controller, Dynamic Host Configuration Protocol (DHCP) Server, exchange server, or some combination thereof. Additionally or alternatively, step 406 may be based on a designation of the network settings received from a user. For example, the BDR module 112 may, at step 406, determine network settings for the networked virtual machines 202a-202c of FIG. 2 based on a designation of the network settings received from a user. This designation may be received from the user, for example, via a GUI associated with the BDR module 112 that is configured to allow the user to visually specify the network settings for the networked virtual machines 202a-202c of FIG. 2.

The method 400 may include a step 408 of storing the order and the network settings in a predetermined network recovery policy. For example, the BDR module 112 may, at step 408, store the order and the network settings in the predetermined network recovery policy 300 in the destination storage 108 of the destination system 104 of FIG. 1. Step 408 may be performed prior to booting the networked machines 102a-102c of FIG. 1 as the networked virtual machines 202a-202c of FIG. 2.

The method 400 may include a step 410 of booting the multiple networked virtual machines from the multiple image backups in the order stored in the predetermined network recovery policy and with the network settings stored in the predetermined network recovery policy. For example, the hypervisor 114 may, at step 410, boot the networked machines 102a-102c of FIG. 1 as the networked virtual machines 202a-202c of FIG. 2 from the image backups 116a-116c of FIG. 1, in the order stored in the network recovery policy 300 of FIGS. 1 and 3, and with the network settings stored in the network recovery policy 300 of FIGS. 1 and 3. Step 410 may be performed subsequent to step 408 and may be performed in response to receiving a command to implement the network recovery policy 300 of FIGS. 1 and 3. Additionally or alternatively, step 410 may include booting the multiple networked machines as the multiple networked virtual machines from the multiple image backups with the timing stored in the predetermined network recovery policy. For example, the hypervisor 114 may, at step 410, boot the networked virtual machines 202a-202c of FIG. 2 from the image backups 116a-116c with the timing stored in the network recovery policy 300 of FIGS. 1 and 3. The booting at step 410 may be automatic. For example, where the command to implement the network recovery policy 300 of FIGS. 1 and 3 is automatically generated, the booting may be automatic. In one example, the command may be automatically generated in response to only a single action by a user, such as a single click of a single "Virtualize" button, or other button or link, by the user, to implement the network recovery policy 300. This single action by the user, such as a single click of a button, may be performed on a device with a display having a relatively small form factor, such as a mobile phone or tablet.

By the conclusion of step 410, the virtual machines 202a-202c will have been virtualized and networked together over the virtual network 210. The use of the predetermined network recovery policy 300 may allow advance testing of the virtualization and may avoid a user needing to manually boot the virtual machines 202a-202c and manually configure network settings of the virtual network 210 during the virtualization, thus avoiding slow user performance and user errors and decreasing downtime during the virtualization.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for virtualizing multiple networked machines using a predetermined network recovery policy, the method comprising:
   identifying multiple image backups of the multiple networked machines based on a designation of the multiple image backups of the multiple networked machines received from a user;
   determining an order for booting the multiple networked machines as multiple networked virtual machines;
   determining network settings for the multiple networked machines when booted as the multiple networked virtual machines;
   prior to booting the multiple networked machines as the multiple networked virtual machines, storing the order and the network settings in the predetermined network recovery policy; and
   subsequent to the storing and in response to receiving a command to implement the predetermined network recovery policy, booting the multiple networked machines as the multiple networked virtual machines from the multiple image backups in the order stored in the predetermined network recovery policy and with the network settings stored in the predetermined network recovery policy.

2. A method for virtualizing multiple networked machines using a predetermined network recovery policy, the method comprising:
   identifying multiple image backups of the multiple networked machines;
   determining an order for booting the multiple networked machines as multiple networked virtual machines based on a designation of the order received from a user;
   determining network settings for the multiple networked machines when booted as the multiple networked virtual machines;
   prior to booting the multiple networked machines as the multiple networked virtual machines, storing the order and the network settings in the predetermined network recovery policy; and
   subsequent to the storing and in response to receiving a command to implement the predetermined network recovery policy, booting the multiple networked machines as the multiple networked virtual machines from the multiple image backups in the order stored in the predetermined network recovery policy and with the network settings stored in the predetermined network recovery policy.

3. A method for virtualizing multiple networked machines using a predetermined network recovery policy, the method comprising:
   identifying multiple image backups of the multiple networked machines;
   determining an order for booting the multiple networked machines as multiple networked virtual machines based on a designation of dependencies between the multiple networked machines received from a user;
   determining network settings for the multiple networked machines when booted as the multiple networked virtual machines;
   prior to booting the multiple networked machines as the multiple networked virtual machines, storing the order and the network settings in the predetermined network recovery policy; and
   subsequent to the storing and in response to receiving a command to implement the predetermined network recovery policy, booting the multiple networked machines as the multiple networked virtual machines from the multiple image backups in the order stored in the predetermined network recovery policy and with the network settings stored in the predetermined network recovery policy.

4. The method as recited in claim 3, wherein the designation of the dependencies between the multiple networked machines is received from the user via a graphical user interface (GUI) configured to allow the user to visually input dependencies using graphical elements beyond text.

5. A method for virtualizing multiple networked machines using a predetermined network recovery policy, the method comprising:
   identifying multiple image backups of the multiple networked machines;
   determining an order for booting the multiple networked machines as multiple networked virtual machines;
   determining network settings for the multiple networked machines when booted as the multiple networked virtual machines, the network settings including port blocking rules for the multiple networked virtual machines;
   prior to booting the multiple networked machines as the multiple networked virtual machines, storing the order and the network settings in the predetermined network recovery policy; and
   subsequent to the storing and in response to receiving a command to implement the predetermined network recovery policy, booting the multiple networked machines as the multiple networked virtual machines from the multiple image backups in the order stored in the predetermined network recovery policy and with the network settings stored in the predetermined network recovery policy.

6. The method as recited in claim 5, wherein the network settings further include static Internet Protocol (IP) addresses for the multiple networked virtual machines.

7. The method as recited in claim 6, wherein the network settings further include network role assignments for the multiple networked virtual machines.

8. The method as recited in claim 7, wherein the network role assignments for the multiple networked virtual machines include assigned roles of domain controller, Dynamic Host Configuration Protocol (DHCP) Server, exchange server, or some combination thereof.

9. A method for virtualizing multiple networked machines using a predetermined network recovery policy, the method comprising:
   identifying multiple image backups of the multiple networked machines;
   determining an order for booting the multiple networked machines as multiple networked virtual machines;
   determining network settings for the multiple networked machines when booted as the multiple networked virtual machines, the network settings including port forwarding rules for the multiple networked virtual machines;
   prior to booting the multiple networked machines as the multiple networked virtual machines, storing the order and the network settings in the predetermined network recovery policy; and subsequent to the storing and in response to receiving a command to implement the predetermined network recovery policy, booting the multiple networked machines as the multiple networked virtual machines from the multiple image backups in the order stored in the predetermined network recovery policy and with the network settings stored in the predetermined network recovery policy.

10. The method as recited in claim 9, wherein the network settings further include static Internet Protocol (IP) addresses for the multiple networked virtual machines.

11. The method as recited in claim 10, wherein the network settings further include network role assignments for the multiple networked virtual machines.

12. The method as recited in claim 11, wherein the network role assignments for the multiple networked virtual machines include assigned roles of domain controller, Dynamic Host Configuration Protocol (DHCP) Server, exchange server, or some combination thereof.

13. A method for virtualizing multiple networked machines using a predetermined network recovery policy, the method comprising:
 identifying multiple image backups of the multiple networked machines;
 determining an order for booting the multiple networked machines as multiple networked virtual machines;
 determining network settings for the multiple networked machines when booted as the multiple networked virtual machines based on a designation of the network settings received from a user;
 prior to booting the multiple networked machines as the multiple networked virtual machines, storing the order and the network settings in the predetermined network recovery policy; and
 subsequent to the storing and in response to receiving a command to implement the predetermined network recovery policy, booting the multiple networked machines as the multiple networked virtual machines from the multiple image backups in the order stored in the predetermined network recovery policy and with the network settings stored in the predetermined network recovery policy.

14. A method for virtualizing multiple networked machines using a predetermined network recovery policy, the method comprising:
 identifying multiple image backups of the multiple networked machines;
 determining an order, and a timing, for booting the multiple networked machines as multiple networked virtual machines;
 determining network settings for the multiple networked machines when booted as the multiple networked virtual machines;
 prior to booting the multiple networked machines as the multiple networked virtual machines, storing the order, the timing, and the network settings in the predetermined network recovery policy; and
 subsequent to the storing and in response to receiving a command to implement the predetermined network recovery policy, booting the multiple networked machines as the multiple networked virtual machines from the multiple image backups in the order, with the timing, and with the network settings stored in the predetermined network recovery policy.

15. A method for virtualizing multiple networked machines using a predetermined network recovery policy, the method comprising:
 identifying multiple image backups of the multiple networked machines;
 determining an order, and a timing, for booting the multiple networked machines as multiple networked virtual machines;
 determining network settings for the multiple networked machines when booted as the multiple networked virtual machines, the network settings including network role assignments, static Internet Protocol (IP) addresses, port blocking rules, port forwarding rules, Virtual Private Network (VPN) configuration, firewall rules, or some combination thereof, for the multiple networked virtual machines;
 prior to booting the multiple networked machines as the multiple networked virtual machines, storing the order, the timing, and the network settings in the predetermined network recovery policy; and
 subsequent to the storing and in response to receiving a command to implement the predetermined network recovery policy, automatically booting the multiple networked machines as the multiple networked virtual machines from the multiple image backups in the order and with the timing stored in the predetermined network recovery policy and with the network settings stored in the predetermined network recovery policy.

16. The method as recited in claim 15, wherein the determining the timing for booting the multiple networked machines as multiple networked virtual machines is based on a designation of a specific wait time between the booting of each of the multiple networked machines as multiple networked virtual machines.

17. The method as recited in claim 15, wherein the determining the timing for booting the multiple networked machines as multiple networked virtual machines is determined in real-time during the booting of the multiple networked machines as the multiple networked virtual machines based on the timing of each of the multiple networked virtual machines achieving a ready state.

18. The method as recited in claim 15, wherein:
 the determining the order for booting the multiple networked machines as the multiple networked virtual machines is based on a designation of dependencies between the multiple networked machines received from a user; and
 the designation of the dependencies between the multiple networked machines is received from the user via a graphical user interface (GUI) configured to allow the user to visually input dependencies using graphical elements beyond text.

19. The method as recited in claim 15, wherein the receiving the command to implement the predetermined network recovery policy is generated in response to only a single action by a user to implement the predetermined network recovery policy.

20. One or more non-transitory computer-readable media storing one or more programs that are configured, when executed, to cause one or more processors to perform the method as recited in claim 15.

21. One or more non-transitory computer-readable media storing one or more programs that are configured, when executed, to cause one or more processors to perform the method as recited in claim 1.

22. One or more non-transitory computer-readable media storing one or more programs that are configured, when executed, to cause one or more processors to perform the method as recited in claim 2.

23. One or more non-transitory computer-readable media storing one or more programs that are configured, when executed, to cause one or more processors to perform the method as recited in claim 3.

24. One or more non-transitory computer-readable media storing one or more programs that are configured, when executed, to cause one or more processors to perform the method as recited in claim 5.

25. One or more non-transitory computer-readable media storing one or more programs that are configured, when executed, to cause one or more processors to perform the method as recited in claim 9.

26. One or more non-transitory computer-readable media storing one or more programs that are configured, when executed, to cause one or more processors to perform the method as recited in claim 13.

27. One or more non-transitory computer-readable media storing one or more programs that are configured, when executed, to cause one or more processors to perform the method as recited in claim 14.

\* \* \* \* \*